Aug. 23, 1938.   M. P. GRAHAM ET AL   2,127,913
HITCH OR COUPLER
Original Filed Nov. 2, 1936
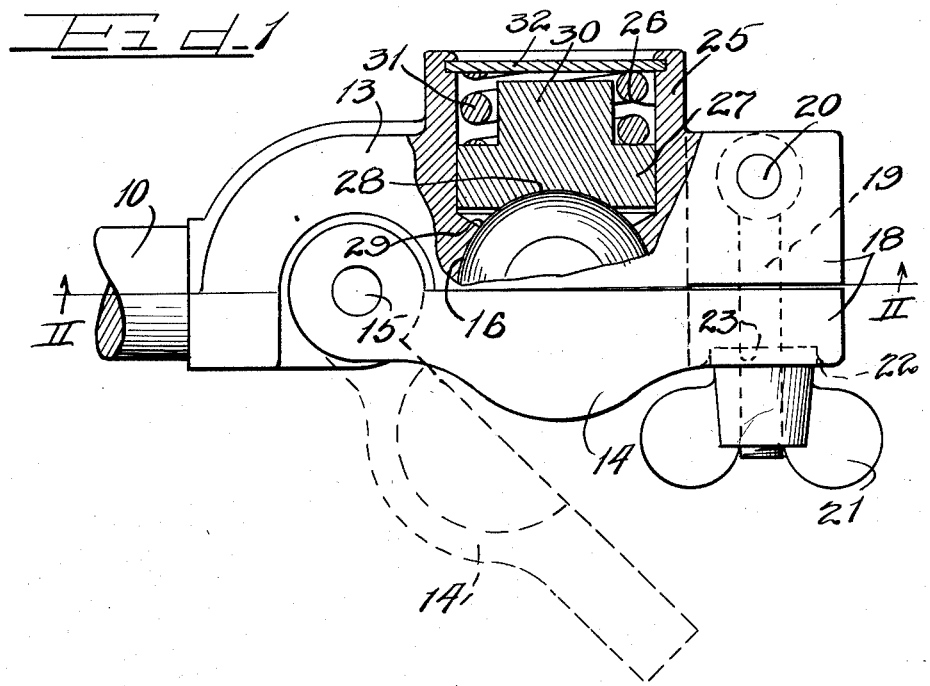
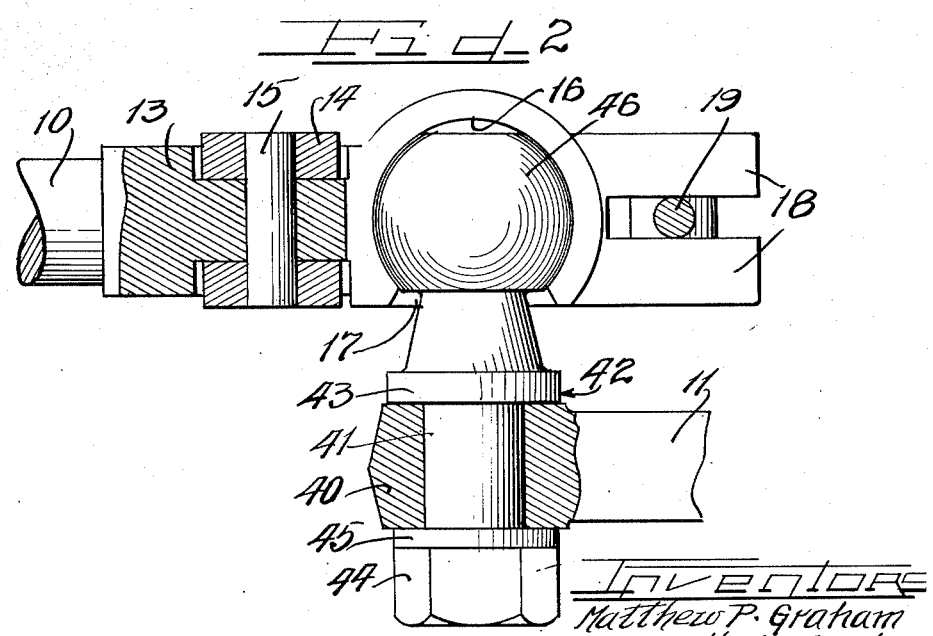
Inventors
Matthew P. Graham
George H. Hufferd
Joseph E. Casse Patented Aug. 23, 1938

2,127,913

UNITED STATES PATENT OFFICE 2,127,913

HITCH OR COUPLER

Matthew P. Graham, George H. Hufferd, and Joseph E. Casse, Detroit, Mich., assignors to Thompson Products Incorporated, Cleveland, Ohio, a corporation of Ohio Original application November 2, 1936, Serial No. 108,782. Divided and this application May 13, 1937, Serial No. 142,342

2 Claims. (Cl. 280—33.15)

This invention relates to hitches or couplers particularly adapted for connecting a trailer with a propelling vehicle. More specifically, this invention relates to a conveniently disengaged hitch having automatic wear take-up features.

This application is a division of our co-pending application entitled "Trailer hitch", Serial No. 108,782, filed November 2, 1936.

According to the present invention, a single connection is provided between the propelling vehicle and the trailer. The connecting device or coupler includes two interconnecting parts, one of which is secured to the propelling vehicle and the other of which is secured to the trailer. The trailer part includes a tongue member attached to the front end of the trailer having a ball socket secured thereon for receiving the ball end of a stud carried by a draw bar extending from the propelling vehicle. The ball socket is composed of two hingedly connected housing parts having complementarily registering segmental spherical inner bearing walls. The hingedly connected parts are readily locked together.

One of the housing parts carries a spring-urged wear take-up member adapted to engage the ball end of a ball member seated on the segmental spherical bearing walls of the housing part.

It is then an object of this invention to provide a single ball and socket connection between a propelling vehicle and a pulled vehicle having automatic wear take-up means.

Another object of this invention is to provide a coupler including a ball-ended member seated in a housing member composed of two complementary parts adapted to be locked together.

A further object of this invention is to provide, in a coupler, a spring-urged bearing block for taking up wear developed during use of the coupler.

Other and further objects of this invention will become apparent from the following detailed description of the annexed sheet of drawings which discloses a preferred embodiment of the invention.

On the drawing:

Figure 1 is a plan view, with a part cut away and shown in horizontal cross section, of a hitch or coupler according to this invention.

Figure 2 is a vertical cross-sectional view, with parts shown in elevation, taken substantially along the line II—II of Figure 1.

As shown on the drawing:

The reference numeral 10 designates a tongue member or rod adapted to be connected to the front end of a trailer. The reference numeral 11 designates a draw bar adapted to be connected to the rear end of a propelling vehicle. The end of the tongue or rod 10 has a coupling housing 13 secured thereon or formed integral therewith. The housing 13 carries on the side thereof a closure member or cap 14 pivotally connected thereon as at 15. The closure member 14 and the housing 13 together defined a segmental spherical socket 16 with an annular opening 17 at the base thereof. The housing member 13 and the closure member 14 have bifurcated ends 18 for receiving therebetween a bolt 19 which is pivoted to the housing member 13 as at 20. The bolt 19 extends through the bifurcated ends 18 of the closure member 14 and receives thereon a wing nut 21 for tightening the closure member 14 to the housing member 13. If desired, the face of the bifurcated ends 18 of the member 14 may be recessed as at 22 for receiving therein a washer 23 disposed around the bolt 19 between the closure member 14 and the wing nut 21. With this construction, the wing nut must be loosened to permit removal of the washer 23 from the recess portion 22 before the bolt 19 can be swung out of the bifurcated ends 18 of the closure member 14 to permit the closure member 14 to be swung away from the housing member 13, as shown in dotted lines in Figure 1.

The housing 13 has a portion 25 extending from the back side thereof having a cylindrical bore 26 therethrough. A seating element or bearing block 27 is slidable in the bore 26 and has a segmental spherical depression 28 communicating with the segmental spherical socket 16 through an opening 29 in the socket wall. The opening 29 is of smaller diameter than the diameter of the seating element 27 so that the seating element cannot enter into the socket 16.

The seating element 27 has a shank portion 30 extending from the back thereof. A coiled spring 31 is disposed around the shank portion 30 between the seating element 27 and a closure plate 32 secured in the portion 25 of the housing. The coil spring 31 urges the seating element toward the opening 29 in the socket wall.

The draw bar 11 has an eye end at 40 for receiving therethrough the shank portion 41 of a ball-ended stud designated generally by the reference numeral 42. The stud 42 has a collar portion 43 abutting the top of the eye end 40. A nut 44 is threaded on the end of the shank 41 of the stud 42 extending through the bottom of the eye end 40, and a washer 45 is interposed between the nut 44 and the bottom of the eye end. The nut 44 pulls the shank 41 through the eye 40 so that the collar position 43 of the stud tightly abuts the top of the eye end. In this manner, the stud 42 is held rigidly on the draw bar 11 and extends upwardly therefrom.

The stud 42 has a ball end 46 adapted to be seated in the socket 16 of the housing and closure member. The tongue 10 is coupled to the draw bar 11 by merely loosening the wing nut 21 so as to be able to swing the bolt 19 out of engagement with the closure member 14 of the housing 13. The closure member is then swung open about its pivot point, as shown in dotted lines in Figure 1, and the ball end 46 of the stud 42 is seated in the socket 16. The closure member 14 is then swung back to receive the bolt 19 and the wing nut 21 is tightened to force the closure member against the housing. Since the closure member and housing define together a segmental spherical socket, the ball end 46 of the stud is freely rotatable and tiltable within the closed housing.

Wear developed during use of the joint is automatically compensated for by the spring-urged seating member 27 which engages a portion of the ball end 46 of the stud and is constantly urged against this ball end.

From the above description, it will be apparent that this invention provides a simple hitch or coupler composed of two hinged together socket forming members which may be placed into position for receiving the ball end of a stud member. A spring-urged bearing block or seating element acts against the ball end of the stud in the socket to prevent looseness in the joint and to take up wear developed during use of the joint.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. In a hitch, a tongue member having a housing on the end thereof provided with a flat side face and a segmental spherical depression in said face, a closure member having a flat side face with a segmental spherical depression therein pivoted to said housing and adapted to be swung against the flat side face of the housing with the depression therein in alignment with the depression in the housing to form a ball socket, said closure member and said housing having openings through the bottom thereof communicating with the ball socket to permit the shank of a ball stud to extend therefrom, a boss portion formed on the back of the housing member having a cylindrical bore therein registering with the segmental spherical socket depression thereof, a seating element having a segmental spherical depression in the face thereof slidable in said bore, and spring means urging said seating element toward the segmental spherical depression in the housing.

2. In a hitch, a tongue member having a housing secured on the end thereof and provided with a flat side face having a segmental spherical bearing wall therein, a closure member having a mating side face and a mating segmental spherical bearing wall therein pivoted to the housing, bifurcated fingers on the free end of the closure member, said fingers having recesses therein spaced from the ends thereof, a bolt pivoted to the housing member and adapted to be swung between the fingers of the closure member, a washer disposed around said bolt and adapted to be seated in the recesses of the fingers, and a nut threaded on said bolt for seating the washer in the recesses of the fingers to clamp the closure member against the housing member whereby said nut must be loosened to permit removal of the washer from the recesses before the bolt can be swung from between the fingers.

MATTHEW P. GRAHAM.
GEORGE H. HUFFERD.
JOSEPH E. CASSE.